Aug. 19, 1930.  H. E. KIP  1,773,229
DRY CELL MANUFACTURE
Filed May 23, 1927   2 Sheets-Sheet 1
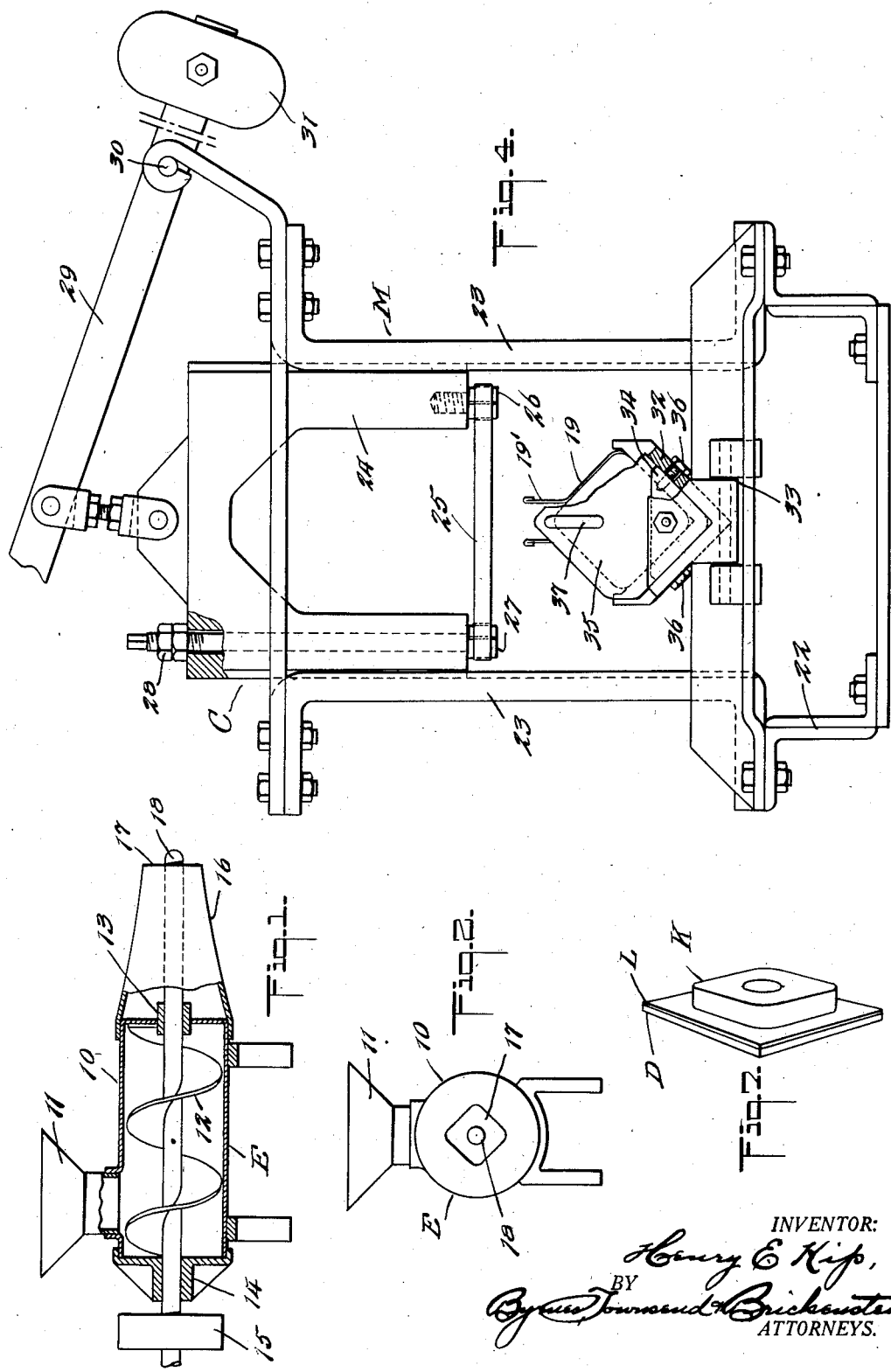

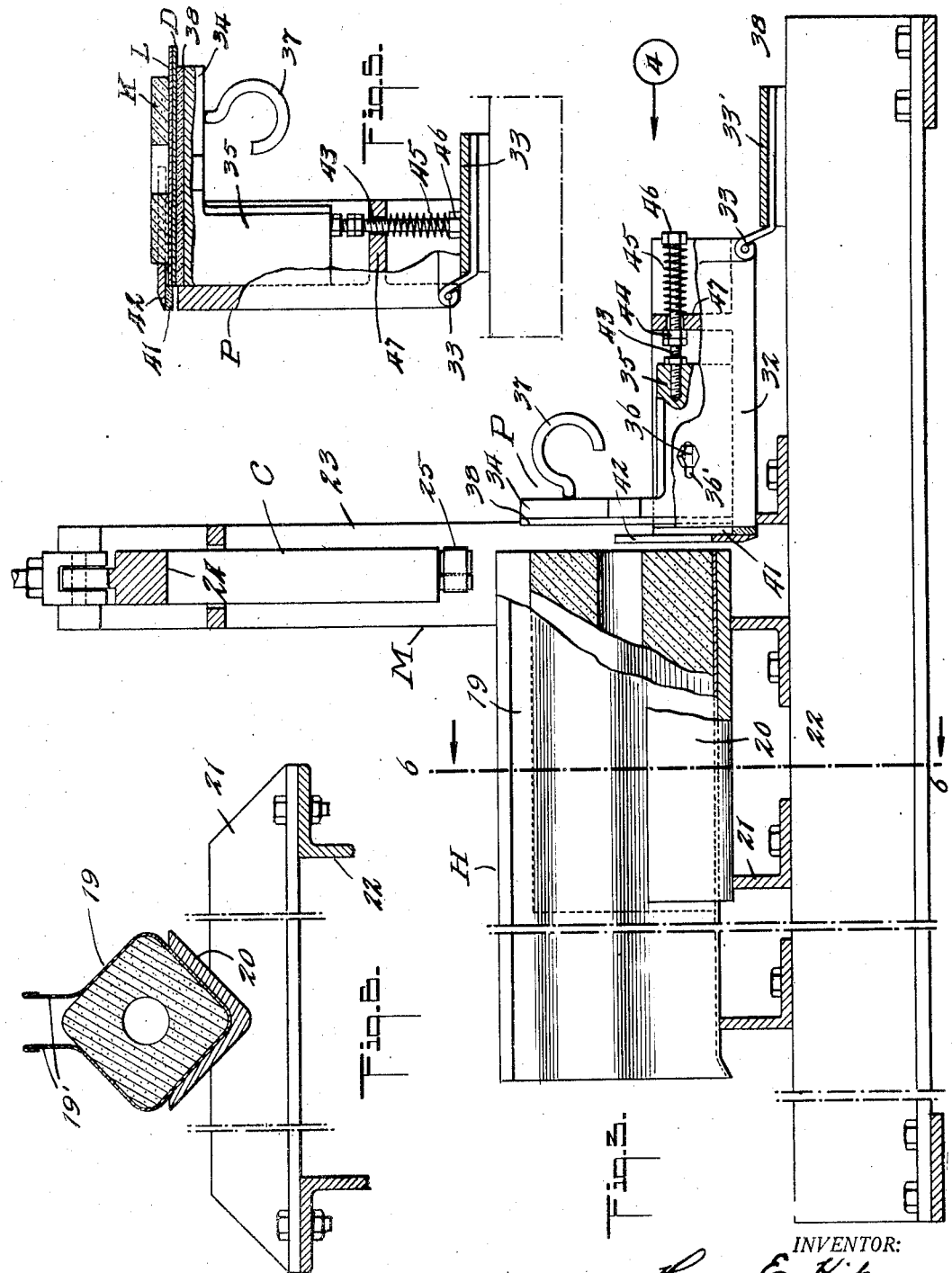

Patented Aug. 19, 1930

1,773,229

UNITED STATES PATENT OFFICE

HENRY E. KIP, OF LAKEWOOD, OHIO, ASSIGNOR TO NATIONAL CARBON CO., INC., A CORPORATION OF NEW YORK

DRY-CELL MANUFACTURE

Application filed May 23, 1927. Serial No. 193,614.

This invention relates to the manufacture of dry cells and more particularly to the manufacture of electrode units for flat type dry batteries similar in general respects to those disclosed in Rider and Huntley Patent No. 1,508,987, assigned to National Carbon Co. Inc.

In making a battery of flat type cells, so-called duplex electrodes are employed, each of which consists of a plate of metal, such as zinc, coated on one face with a conductive composition, such as carbonaceous material. In a battery assembly of a series of such electrodes a body of depolarizing material, comprising a moist mixture of carbonaceous material, manganese dioxide and electrolyte, is disposed between the coated side of one electrode and the uncoated side of the next one, such depolarizer contacting directly with the carbonaceous coating and being slightly separated from the uncoated face of the zinc plate by a sheet of bibulous material, such as pulp-board or paper moistened with excitant paste. Heretofore, each depolarizer body or mix cake has either been molded separately and then applied or molded directly in place onto the coated or carbon side of a duplex electrode. The depolarizer is moist and contains electrolyte salts which tend to corrode the molds and often mix is left adhering to the latter, thus causing inefficient operation of the molding machine, requiring too frequent interruptions of the machine for cleaning, adjustment or repairs, and resulting in damaged cell elements.

The primary objects of this invention are to provide manufacturing procedure and apparatus which shall substantially overcome difficulties heretofore encountered in the manufacture of flat type dry cells; to provide a less expensive and more efficient machine for assembling a depolarizer body and electrode; and to provide an improved product.

These and other objects and the novel features of this invention will become apparent from the following description, taken with the accompanying drawings, in which:

Figs. 1 and 2 are respectively, sectional and end views of a machine for extruding depolarizing material;

Fig. 3 is a side view, partly in section, illustrating a machine according to my invention, for cutting depolarizer mix cakes and applying the same to duplex electrodes;

Fig. 4 is a front end view of the machine shown in Fig. 3;

Fig. 5 is a sectional view showing the platen of the machine of Fig. 4, swung into elevated position;

Fig. 6 is a cross-sectional view on the line A—A of Fig. 3; and

Fig. 7 is a perspective view of a duplex electrode with a mix cake applied thereto according to this invention.

According to the present invention, the moist electrolyte-containing depolarizing material is compacted in and extruded from a suitable mechanism such as the screw press E, into an elongated body of the desired cross-section. As shown, the press E may consist of a casing 10 carrying a charging hopper 11 and containing a compressing and feeding screw 12 mounted in bearings 13, 14 and driven by pulley 15. The material is continuously advanced through the tapering casing section 16 and discharged from a substantially rectangular orifice 17 onto a suitable table where it may be cut into loaves or bars of the desired length for handling and for use in the cutting and assembling machine M of Figs. 3 and 4, where individual mix cakes are sliced from a loaf and applied to duplex electrodes. The extruding machine is desirably glass coated or enamelled on the inside or made of material that will resist corrosion and wear and will not contaminate the depolarizer mixture, and has a core 18 whereby a central hole is formed through the extruded body, for a purpose to be described.

In order to protect the loaves of depolarizing material against deterioration and evaporation of moisture content, they are preferably coated on all sides with a plastic adherent insulating composition, such as a mixture of 50% scale wax, 35% grade E rosin and 15% blown petroleum asphalt. This may be done by spraying the composition onto the loaves or by dipping them into it, the composition being hardened by heat if desired and the ends of the holes in the loaves being plugged before the coating is applied.

The coating and the plugs seal the loaves to prevent deterioration and loss of moisture when they are stored and handled. Moreover, the exterior coating on the loaf mechanically reinforces it so that crumbling and other damage are reduced, particularly while cutting off each individual depolarizer body or mix cake, and the latter is likewise reinforced and insulated by the coating that remains on the entire perimeter thereof after it is cut from a loaf and applied to an electrode.

As shown, the cutting and assembling machine M comprises a loaf holder and guide H; a cutter frame C movable across the front end of the holder H; and a platen P upon which a substantially rectangular duplex or composite electrode may be mounted, then presented to the front end of a loaf in the holder H to support the end of the loaf while a relatively thin rectangular mix cake is severed therefrom and applied to the duplex electrode, and then returned to its loading position with the mix cake adhering to and accurately located on the duplex electrode.

The loaf holder and guide H comprises a rectangular sheet metal sheath 19 which is open at its upper corner where it is provided with out-turned edges 19' whereby the resilient sheath may be expanded to insert the loaf endwise therein. The sheath 19, or if preferred, the loaf without a sheath, is mounted in a V-shape trough 20 that is supported by legs 21 upon the machine bed 22.

The bed 22 also carries vertical guides 23 on opposite sides of the front end of the holder H, along which guides the cutter frame C is slidable. The cutter frame comprises an inverted U-shape yoke 24 that has a cutter 25 of metal ribbon extending across its lower end. One end of the cutter 25 is fixed to a bolt 26 and the other end so secured to a bolt 27 that the cutter may be drawn taut by turning this bolt at its upper end, the cutter being held at the desired tension by lock nuts 28. The frame C may be reciprocated by suitable means, such as a lever 29 which is connected to the yoke 24 and pivoted at 30, beyond which the lever carries a counter-weight 31 to assist in raising the frame C. The cutter 25 is thus movable across the front end of the loaf holder to successively shear off mix cakes of the desired thickness as the loaf is fed forward and the platen P is lowered to receive a cake.

The platen P may comprise a V-shaped channel member or base 32 that is swingable about a horizontal pivot 33 on a bracket 33' secured to the machine bed. The base 32 carries the electrode support or seat 34, which is perpendicular to one end of the base 32 and has a horizontal leg 35 fitting in and slidably movable along the base, such movement being limited by pins or bolts 36 secured to leg 35 and arranged to engage ends of slots 36' in the base 32. A hook 37 or other suitable means may be connected to the platen assembly to operate the same. As shown, the hook 37 is secured to the seat 34, so that the platen may be swung about the pivot 33.

The electrode seat 34 is desirably provided with a rubber face 38, and bakelite ledges 41 are provided along one end and the adjacent sides of the seat to properly position and support the duplex electrode at its lower edges and sides when the platen is lowered to receive a mix cake. A bakelite guard ledge 42 that extends inwardly and overhangs the ledges 41 is also provided on the seat 34 to retain the electrode on its seat and to support the mix cake at its lower edges during the severing operation and while the platen is lowered and raised.

The electrode seat is adjustable and yieldable longitudinally in the base 32 to take up wear and to lift the seat 34 slightly when the electrodes are inserted and withdrawn. To this end, the leg 35 carries a rearwardly extending bolt 43 that projects through a guide and abutment 47 on the base 32. Adjustable nuts 44 on the bolt 43 on one side of the guide 47 limit the rearward movement of the seat 34, and a spring 45 bearing against the other side of the guide 47 and against a head 46 on the bolt 43 normally yieldingly holds one of the nuts 44 against 47. The bolt 43 may be of such length that the head 46 thereof will engage a bracket 33' when the platen is swung up to slightly raise the seat 34.

Briefly, the apparatus operations are as follows: Suitable depolarizing material is fed into the press E and discharged in compacted loaf form, coated as described, and delivered to the holder of the cutting and applying machine M, where a slice is first severed from the front end of the loaf and discarded, if its face is coated. A paper or pulpboard liner L which contains sufficient excitant paste or moisture to cause it to adhere to the uncoated side of a duplex electrode D, is applied to the latter, which is then properly placed on the swung-up platen, the carbon side of the electrode engaging the rubber facing 38 of the seat 34. The platen is then swung down and the front end of the depolarizer loaf is pushed against the liner L until the nut 44 abuts against 47, whereupon the end of the loaf and the electrode are pressed together, while the cutter 25 is lowered and slices off a mix cake which adheres to the liner L that in turn adheres to the duplex electrode. The platen is then swung up, the completed unit removed, another paper-lined duplex electrode is inserted and the loaf is advanced and pressed against the next electrode for a repetition of the operation. As the completed units are removed, they are properly stacked in a suitable holder, from which the required number for a battery of a given voltage may be directly removed for insertion in a battery box. It will be understood that suitable automatically-operated mechanism may be provided for feeding depolarizer loaves; loading paper-lined electrodes onto the platen; removing and stacking the completed units; and assembling a series of them in a battery box.

The relatively thin rectangular mix cakes produced according to this invention are of uniform density and size, their reinforced insulated edges resisting crumbling and reducing the possibility of detached mix particles getting into various parts of the battery. During the cutting operation, the elongated loaf of rectangular cross-section is desirably disposed in a horizontal position with one corner uppermost so that the descending cutter will first enter the loaf at a corner, thus encountering less resistance in starting the severing operation and reducing such tendency as there may be to crumbling or otherwise damaging the slice that is being severed or the end of the loaf from which it is cut. The composite electrode is, of course, also presented to the end of the loaf with one corner of the electrode uppermost, so that the slice will be symmetrically deposited on the electrode directly as it is severed from the loaf. A complete dry battery unit is shown in Fig. 7 from which it will be seen that the mix cake is of smaller area than the zinc plate of the duplex electrode. Moreover, each mix cake has a central hole therethrough which advantageously provides cavities or air spaces between the successive duplex electrodes of a battery, to receive gas which is liberated and paste which expands in the inter-electrode spaces, as more fully explained in Dittrick and Chaney application, Ser. No. 160,961, filed January 13, 1927.

While it is preferable to stick a bibulous liner onto the exposed zinc surface of the duplex electrode and then apply the mix cake to the attached liner, if desired, the mix cake may be applied directly to the carbon-coated side of the duplex electrode by placing the latter with its zinc side against the facing 38 on the seat 34 before the electrode is presented to the end of the mix loaf for severing a mix cake. However, this procedure requires that a liner L be placed on the exposed side of each mix cake or on the exposed zinc face of each electrode when the units are being stacked or any time during manufacture but prior to the assembly of a number of units as a battery.

Because of its simplicity, the improved apparatus is not only comparatively inexpensive to install but is also less liable to get out of order and therefore more economical to maintain in efficient operating condition. The metal parts of the apparatus, particularly those contacting with the depolarizing material, are preferably made of material resistant to corrosion and wear, or may be glass coated or enamelled, to avoid contamination of the battery mixture and undue wear of the apparatus. Various changes may be made in the details of the disclosed construction without departing from the spirit of the invention.

I claim:

1. Process of making a dry battery unit that comprises compacting depolarizing mix into the form of a loaf; coating the lateral surface of said loaf; pressing the end of said loaf and a flat electrode together; then cutting transversely through said loaf and its coating to sever a relatively thin section of mix and coating while simultaneously depositing such section on said electrode.

2. Process of making a dry battery unit that includes providing a composite flat electrode comprising a zinc plate having a carbonaceous coating on one face thereof and a sheet of bibulous material on the other face thereof, compacting depolarizing material into loaf form having an axial hole therethrough, coating the lateral surface of such loaf with a protective and reinforcing material, pressing together the end of said loaf and said sheet backed by said plate, and then cutting transversely through said loaf and the coating thereon so as to sever a relatively thin peripherally reinforced slice from said loaf and directly deposit such slice no said sheet of said electrode.

3. In apparatus for making dry battery units, the combination of a support for a body of compacted depolarizing material; means for holding an electrode against said body, and means for cutting off a section of said body adjacent said electrode.

4. Process of making a dry battery unit that comprises compacting depolarizing mix into the form of a loaf; placing only the end of the loaf in contact with an electrode; pressing the electrode against the end of the loaf, and cutting a mix cake from the loaf while the electrode and loaf are pressed together.

5. Process of making a dry battery unit that comprises compacting depolarizing mix into the form of a loaf; pressing the end of the loaf and a flat electrode together; then cutting through the loaf to sever a thin section thereof while simultaneously depositing such section on said electrode.

6. Process of making a dry battery unit which includes providing electrode means comprising an anode member and a cathode member contacting with one side of said anode member; applying a bibulous liner to the other side of said anode member; pressing a compacted loaf of depolarizer mix on the outer side of said liner, and cutting off a depolarizer unit while the loaf and liner are compressed.

In testimony whereof, I affix my signature.

HENRY E. KIP.